(No Model.) 6 Sheets—Sheet 1.
F. FANTA.
APPARATUS FOR MAKING OXYGEN.
No. 519,627. Patented May 8, 1894.
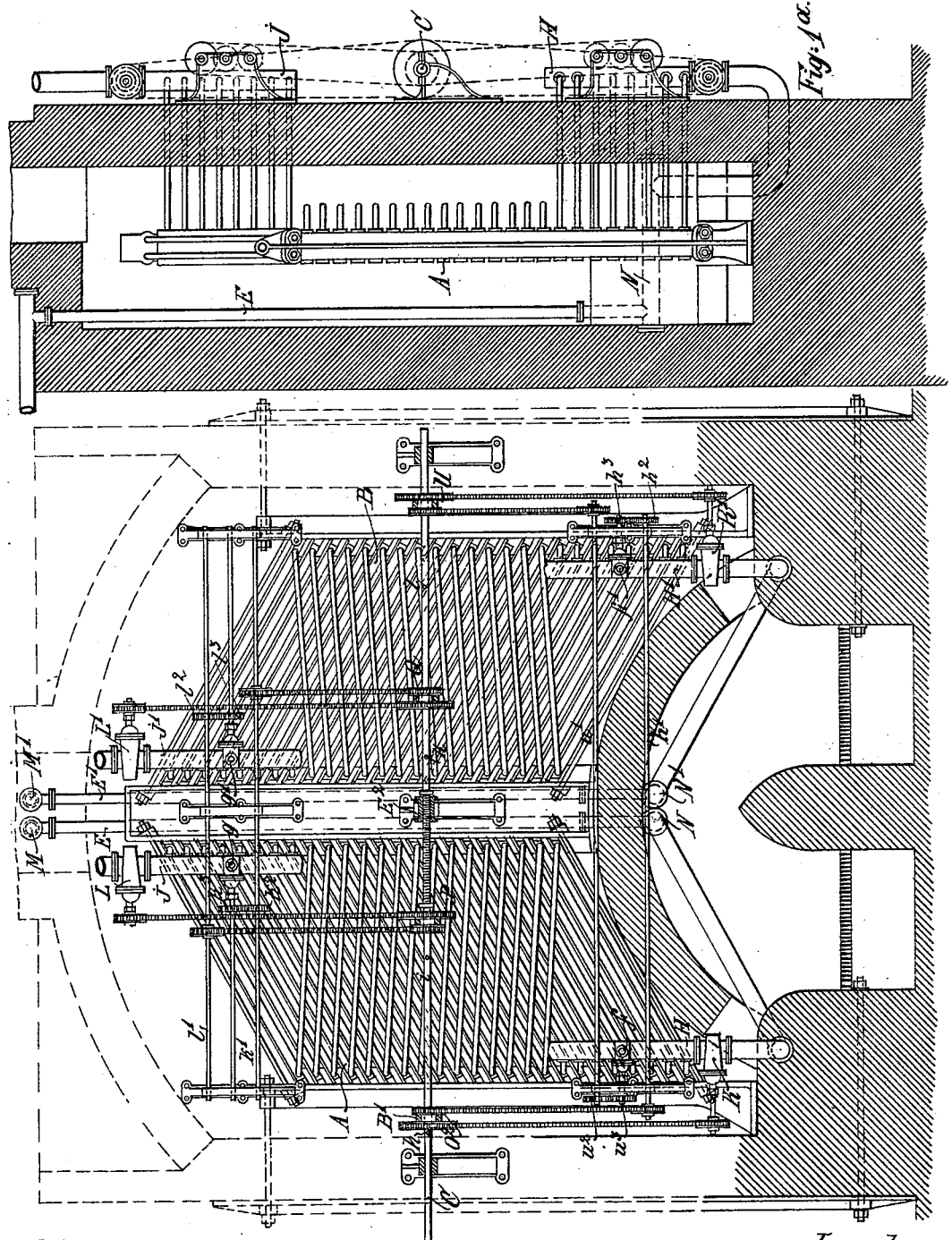
Witnesses
Carl Rofsbach
J. Irrmisch.
Inventor:
Ferdinand Fanta
by Robt Dunk
Attorney.

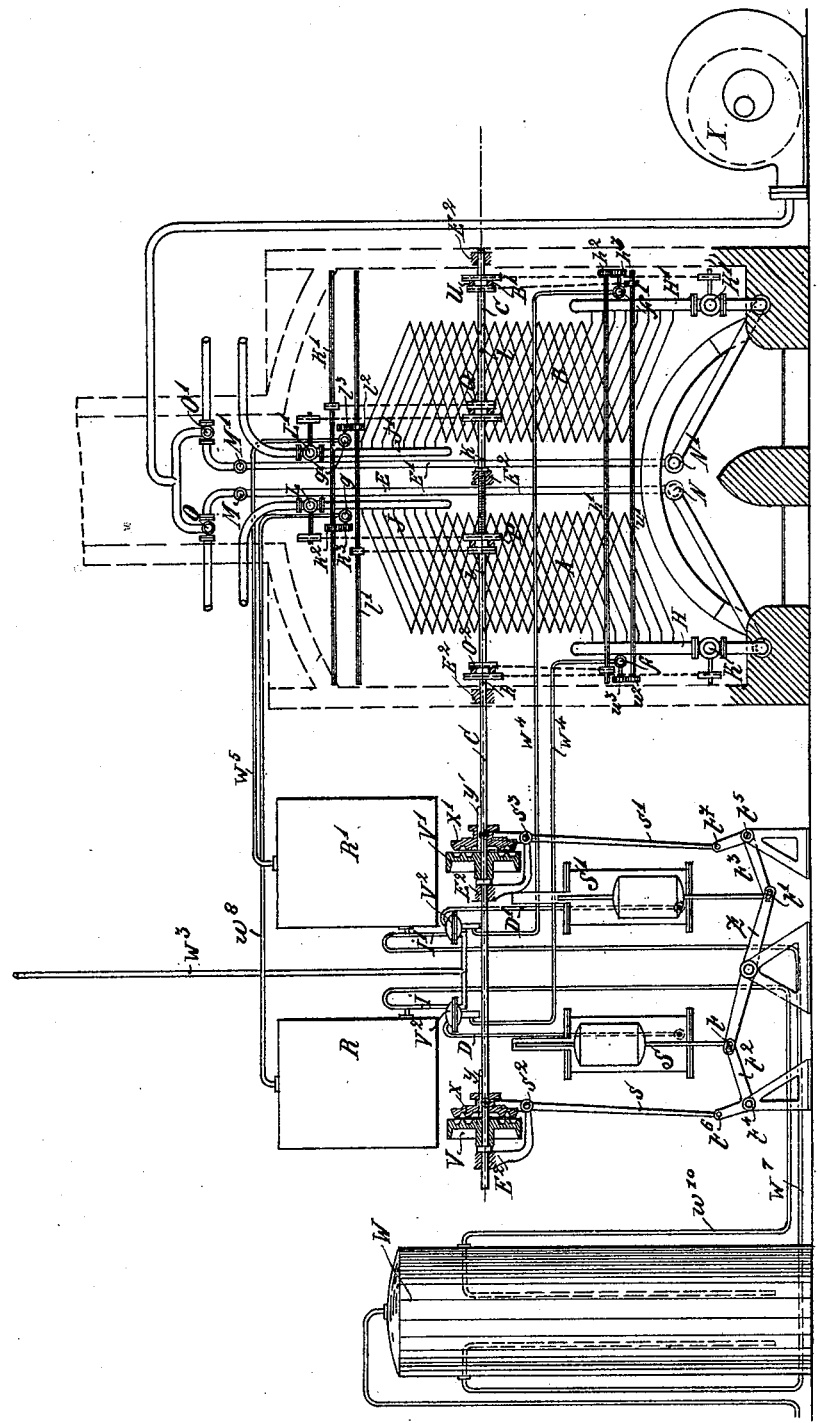

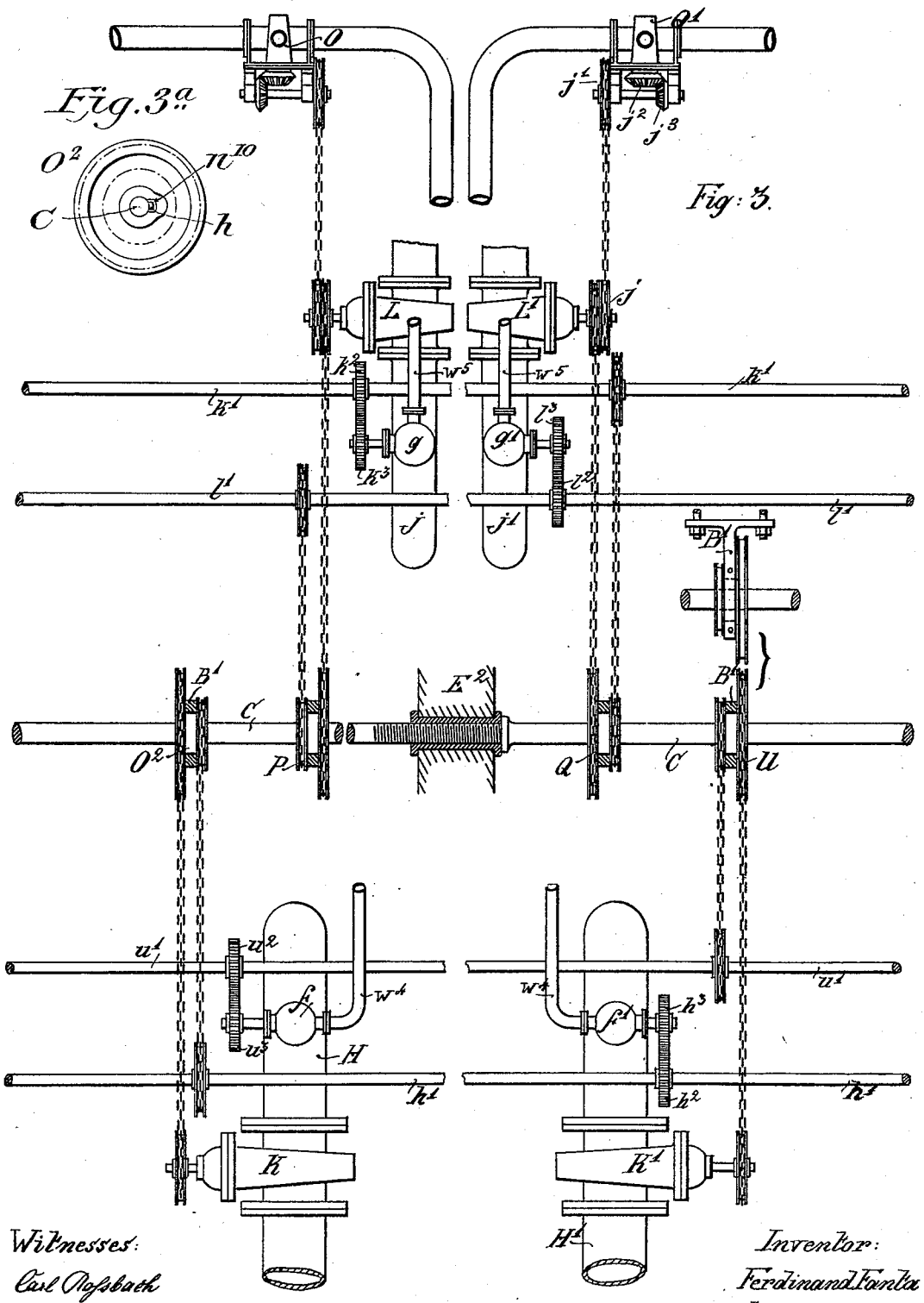

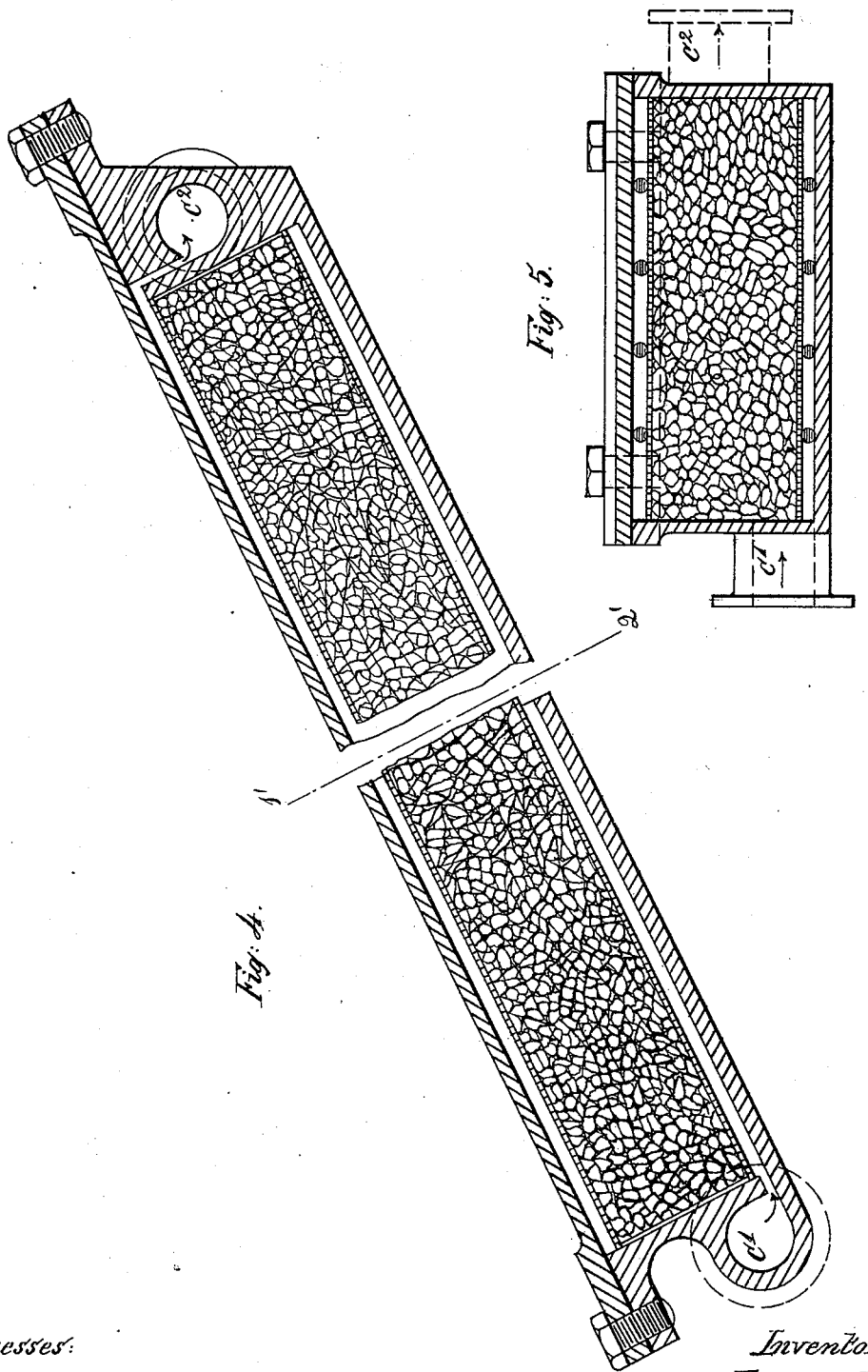

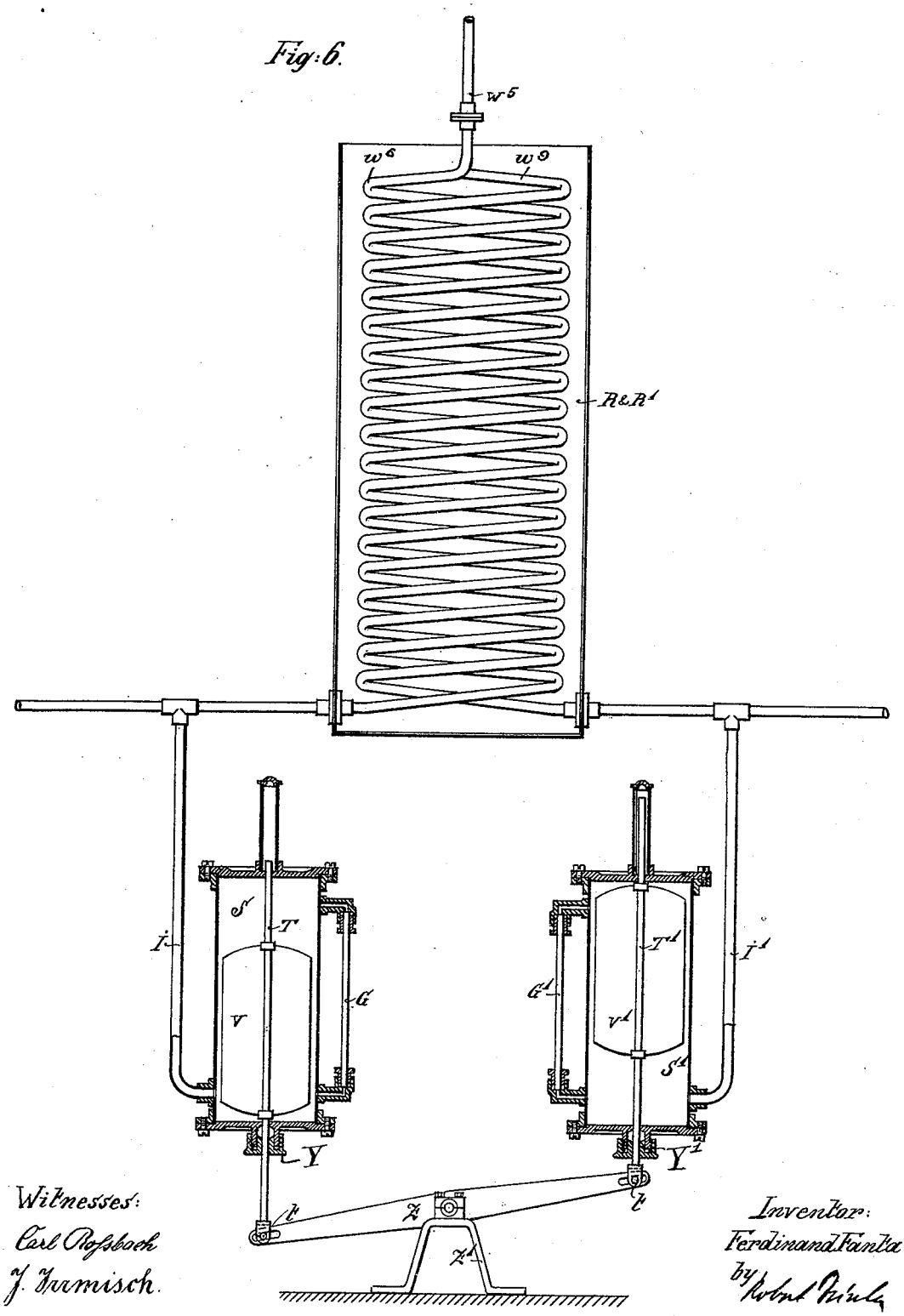

(No Model.) 6 Sheets—Sheet 6.
F. FANTA.
APPARATUS FOR MAKING OXYGEN.
No. 519,627. Patented May 8, 1894.
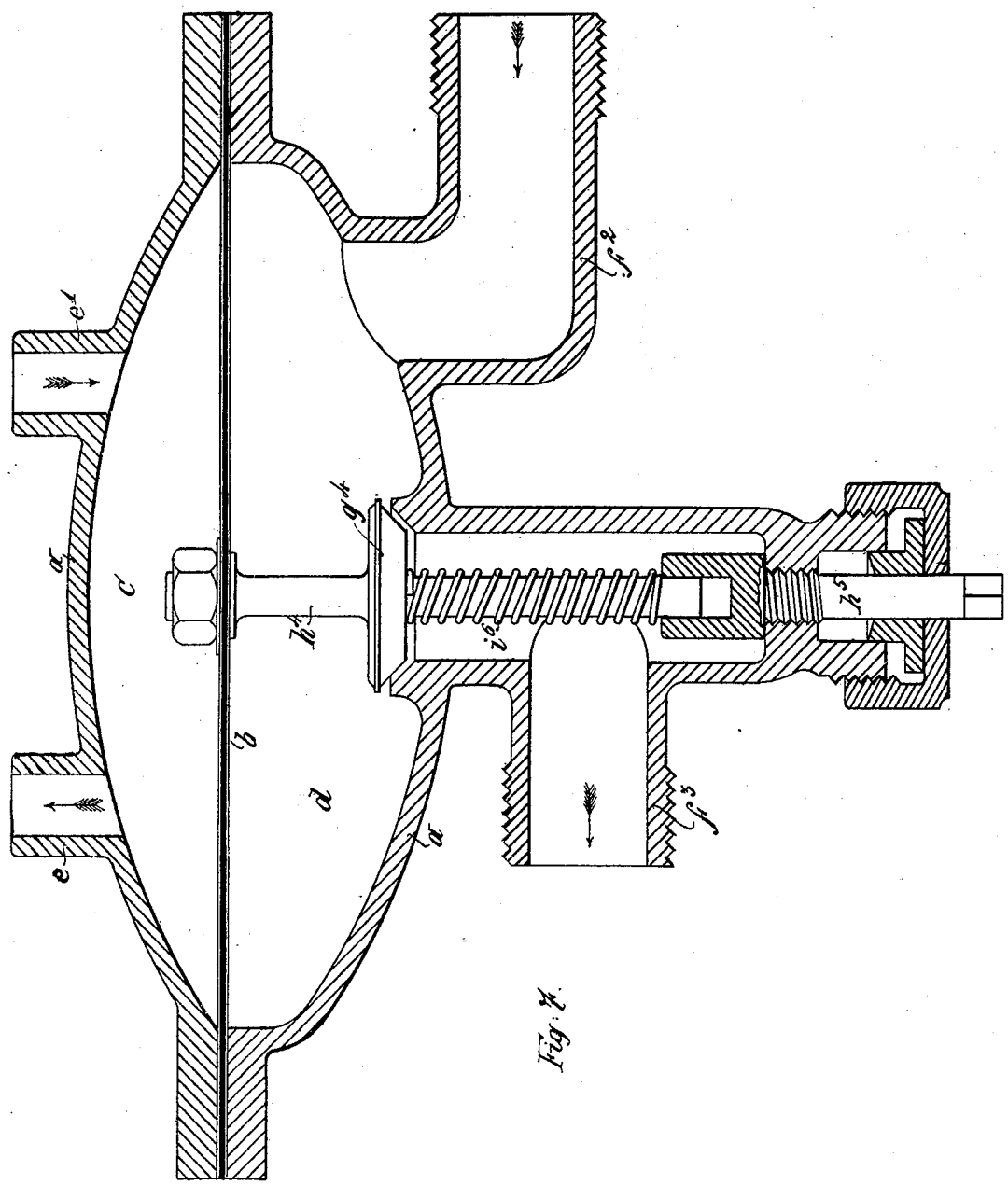
Witnesses:
Carl Rossbach.
J Framisch.
Inventor:
Ferdinand Fanta
by Robert Orule
Attorney.

UNITED STATES PATENT OFFICE.

FERDINAND FANTA, OF LONDON, ENGLAND, ASSIGNOR TO THE OXYGEN PRODUCING SYNDICATE, LIMITED, OF SAME PLACE.

APPARATUS FOR MAKING OXYGEN.

SPECIFICATION forming part of Letters Patent No. 519,627, dated May 8, 1894.

Application filed May 12, 1892. Serial No. 432,813. (No model.) Patented in England June 23, 1891, No. 10,667.

*To all whom it may concern:*

Be it known that I, FERDINAND FANTA, a subject of the Queen of Great Britain, and a resident of Gresham Street, London, in the Kingdom of England, have invented a new and useful Apparatus for an Automatic and Continuous Production of Oxygen Gas, (for which I have obtained a patent in Great Britain, No. 10,667, dated June 23, 1891,) of which the following is a full, clear, and exact specification.

My invention relates to an apparatus for producing oxygen gas in a continuous way, and the apparatus for this purpose consists of two similar parts, one of the same containing materials which are reduced and thereby give off oxygen, the other materials undergoing oxidation, and I also provide devices by means of which these two processes are automatically reversed in the two parts of the apparatus when the production of oxygen ceases in one of said parts. My invention further consists in several contrivances or mechanisms for securing an exact and completely reliable working of the apparatus, so that it is not necessary to watch the same continually.

I will hereinafter give a specified description of an apparatus constructed and operated according to my invention, and will refer to the accompanying sheets of drawings, in which—

Figure 1, Sheet I, is an elevation of the principal part of the apparatus, in which oxygen gas is generated. Fig. 1$^a$ is a cross-sectional elevation of the same. Fig. 2, Sheet II, shows the general arrangement of the apparatus. Fig. 3, Sheet III, shows the mechanism for closing and opening the valves, drawn on an enlarged scale. Fig. 3$^a$ shows one of the coupling-wheels belonging to the mechanism of Fig. 3. Fig. 4, Sheet IV, is a longitudinal section of one of the retorts, in which the materials for the production of oxygen are placed. Fig. 5 is a cross-sectional elevation of the same on line 1'—2' of Fig. 4. Fig. 6, Sheet V, is a separate sectional view of the mechanism for reversing the processes. Fig. 7, Sheet VI, is a sectional elevation of a pressure regulated valve.

Similar letters refer to corresponding parts throughout the different views of the drawings.

Before using the apparatus, I subject the material manganate of soda or of potash, which I employ for the production of oxygen, to a preliminary treatment having for its object to render said material practically infusible. This treatment of the material previous to charging the apparatus is indispensable, and I will therefore first describe the same.

I take a solution of five per cent. of caustic soda (or potash) in water and add this to the material, that is to say, to the manganate of soda (or of potash), by small quantities, until a mass of paste-like consistence is formed. Hereafter I apply a gentle heat and thereby gradually evaporate the water, which is preferably accomplished in the retorts described farther on, or in similar apparatus. The material is thus molded into small plates which are broken into small pieces and then heated as strongly as possible in crucibles. When cooled, the material may be reduced to grains of very small size. The material subjected to this treatment does not melt in the retorts, nor does it adhere to the surface of the same, but each of the particles very easily gives off the oxygen it contains. The apparatus, into which the material may then be charged, consists of a furnace (Fig. 1) of appropriate size and shape, into which are placed two sets of retorts A and B, or more, if required; each of said retorts is constructed in the manner shown in Figs. 4 and 5 and consists of a recipient having the shape of a prismatic box, which may be closed by a cover secured to the same by means of screws. Within this first recipient I place a second, smaller one of similar shape, the top and bottom of which are perforated so as to form a sieve. The free space remaining above and below the interior recipient is divided longitudinally by means of wires, as shown in Fig. 5. The steam and hot air, as hereinafter more fully explained, is admitted to the lower surface of the inner recipient from the channel $c'$ provided at the lower end of the retort, and communicating with suitable pipes for the introduction of steam or air in a manner presently to be described. The oxygen generated in the retort, and the nitrogen escape through the channel $c^2$. The dimensions of these retorts may be varied with those of the whole apparatus, the layer of material in the retorts, however, should not be too thick, as the perfect oxidation or reduction of said material chiefly depends on all particles of the same coming into close contact with the air and the steam respectively.

In the apparatus illustrated by the drawings, each set of retorts A and B is again divided into three series, each comprising eight retorts. The under ends of the eight lower retorts are connected with the cylinders or collectors H and H', and the upper ends of the eight upper retorts with the collectors J and J'. The retorts of each set are parallel to one another and inclined at an angle of about sixty degrees. The connection between the retorts themselves is such, that the upper end of the first retort in the lower series communicates with the lower end of the first retort in the middle-series, and that the upper end of the first retort of the middle-series communicates with the lower end of the first retort of the upper series; thus the steam and air on their way from collector H or H' to J or J' pass at the same time through eight groups of three retorts. The tubes effecting the communication between the retorts are also somewhat inclined, the outlet channel $c^2$ of one retort being placed a little lower than the inlet channel $c'$ of the retort to which the first is connected. This is very important in order to insure a rapid upward movement of the gas and an easy passage of the same through the retorts. The collectors H and H' are closed at their top, and the collectors J and J' at their bottom. These collectors are provided with their respective valves K K' L L' for admitting a convenient quantity of air into the eight groups of parallel retorts at a certain period of the process and for letting said air out of the retorts. About in the middle of the collectors H H' steam-inlet-valves $f$ $f'$ are placed on the outside of the latter, whereby communication between the collectors H H' and the steam-pipes $w^4$ is established or interrupted (see Figs. 2 and 3). The steam-pipes $w^4$ pass through a great part of the furnace before reaching the collectors H and H', in order that the steam may be heated to the same degree as the retorts (which are surrounded by the gases of combustion) and the contents of said retorts.

In the space between the retorts A and B, or behind the same, I place two vertical pipes E and E', or two series of such pipes. The upper ends of all pipes belonging to each of these series, are connected by means of the horizontal pipes M M' (Figs. 1 and 2), and the lower ends of the same by means of similar pipes N N'. The latter communicate with the collectors H and H', the former are in communication with a simple machine for blowing air into the pipes E E', such as a fan or other blast engine, as shown at X. The inclined tubes which conduct the air from pipes N N' to the collectors H H' are placed directly above the fire, so that the air is heated very rapidly and energetically, and is brought to the same temperature as the material subjected to the process and the steam passing through the pipe $w^4$. In order that the air introduced into the retorts may be as dry as possible, the pipes E E' are filled with pieces of dry chlorid of calcium which absorb the humidity of air. Two way-cocks O O' are inserted in the pipes leading from the blast-engine X to the pipes M M', and these cocks are automatically turned by a suitable mechanism in the manner described farther on, so that the pipes E and E' are alternately placed in communication with the atmospheric air and with the fan X. For instance, while the air flows through the series E and is dried by the chlorid of calcium contained in the same, the series E' communicates with the outer air, so that the humidity absorbed by the chlorid during the preceding operation is evaporated and escapes from the pipes E'. Thus the chlorid of calcium may again be used for the following operation, and the efficiency of this part of the apparatus remains always the same, for the amount of moisture introduced by the air being very slight and such moisture being got rid of by evaporation at each cycle, a clogging of the pipes E and E' does not take place in practice.

Corresponding to the steam-inlet-valves $f$ and $f'$ on the collectors H and H', I provide similar outlet-valves $g$ $g'$, which may be called oxygen-valves, on the collectors J and J'. Pipes $w^5$ $w^8$ (Fig. 2) lead from these oxygen valves into coolers R and R' which are filled with water. The pipes $w^5$ $w^8$ form serpentine coils $w^6$ $w^9$ (Fig. 6) within the coolers R and R'; these coils are connected with a purifier W by pipes $w^7$ $w^{10}$, and the oxygen is led then to a gasometer not shown in the drawings. Branch-pipes I and I' put the serpentine pipes in communication with the mouth $e$ of a pressure regulated valve $V^2$ which is illustrated in detail by Fig. 7.

This device consists of a box or casing $a$ made of two parts which are separated by an elastic membrane or diaphragm $b$ dividing the interior of the casing into two chambers $c$ and $d$. Each of the latter is provided with two mouths $f^2$ $f^3$ and $e$ $e'$ respectively. To the center of the membrane C is secured the bolt $h^4$, to which is fixed the valve $g^4$ having its seat on an inclined shoulder at the inner end of the channel leading to the mouth $f^3$. The free end of bolt $h^4$ fits into a bore provided in the head of a threaded pin $h^5$ which is screwed in at the end of the mouth $f^3$. A spiral spring $i^6$ is placed round the bolt $h^4$ between the head of the pin $h^5$ and the valve $g^4$ and thus always tends to keep the latter open. The tension of said spring $i^6$ may be varied by screwing the pin $h^5$ up or down. The mouth $f^2$ is in communication with the steam-tube coming from the boiler (not shown in the drawings) through the pipe $w^3$, and the mouth $f^3$ communicates with the pipe $w^4$ leading to the steam-inlet-valves $f$ and $f'$ respectively. The mouth $e$ is connected to the branch-pipe I or I' coming from the cooler R or R' respectively, and the mouth $e'$ to the end of the pipe D or D′ respectively leading to the lower-part of reservoirs S or S′ respectively. (Fig. 2.) It will be understood that I provide two identical pressure regulated valves of the described construction, the one being connected on one side to pipe $w^4$ leading to steam-inlet-valve $f$, on the other side to the branch I and pipe D communicating with cooler R and reservoir S respectively, while the other pressure regulated valve is connected to pipe $w^4$ leading to steam-inlet-valve $f'$ and to the branch pipe I′ and pipe D′ communicating with cooler R′ and reservoir S′ respectively. The reservoirs S and S′ partly filled with water are closed on top and have a hole in the bottom through which pass the rods T and T′ respectively, which are guided through stuffing-boxes Y and Y′ respectively. The lower ends of the rods T and T′ are linked at $t$ and $t'$ to a beam Z pivoted at a support Z′. The height of the pivot is such, that when the beam Z lies horizontal, the rods T and T′ are in their middle position. A water-gage G and G′ respectively is connected with the upper and lower ends of the reservoirs S and S′. Inside the latter floating cylinders or floats $v$ and $v'$ are secured to the rods T and T′ respectively. The length of these floats $v$ and $v'$ is such, that when the beam Z is in its most inclined position and the end of one of the rods T and T′ (T′ as shown in Fig. 6 of the drawings) almost touches the top of the cap of the reservoir in which it slides, the outer rod T has drawn the float $v$ nearly down to the bottom of the reservoir S. To the beam Z are also linked at $t$ and $t'$ the bent levers $t^2$ and $t^3$ pivoted at $t^4$ and $t^5$ and again linked at $t^6$ and $t^7$ respectively to the fulcrum levers $s$ and $s'$ pivoted at $s^2$ and $s^3$. The upper ends of these oscillating levers $s$ and $s'$ engage with the circular grooves of the short serrated sleeves $x$ and $x'$. These sleeves are mounted on the shaft C by means of longitudinal feathers $y$ and $y'$ and a corresponding groove which causes them to rotate together with the shaft C, but allows for a longitudinal displacement of the sleeves on this shaft. On the latter are also loosely mounted the serrated pulleys V and V′ which are continually kept running in opposite directions by means of an open and a crossed belt respectively being connected to the driving-shaft not shown on the drawings. The internal side of the circumferential part of the pulleys is provided with a serrated surface, so that the sleeves $x$ and $x'$ and the pulleys V and V′ may be coupled by pushing the sleeves against the pulleys, the said serrated parts fitting into one another and acting as a friction clutch. Thus the shaft C may be caused to revolve for some time in either one or the other direction according to whether lever $s$ or lever $s'$ is in operation. When neither is in operation the shaft is at rest. The coupling of the sleeves $x$ and $x'$ with the pulleys V and V′ may, of course, be effected in any other manner, and the above described device is only an example showing how this coupling may be accomplished. A portion of the shaft C is threaded and the shaft rotates in bearings E², one of which is interiorly threaded correspondingly to the thread of shaft C (Figs. 1 and 3), the others are bearings of the usual kind. Thus when the shaft C is rotated, it is also displaced in the direction of its axis toward either the left or the right according to the direction of its rotation. The loose pulleys V and V′ and the serrated sleeves $y$ and $y'$, however, always remain at the same place, notwithstanding this lateral displacement of shaft C.

The portion of shaft C opposite the furnace is provided with four double chain-wheels $O^2$, P, Q, U, mounted loosely on the same (see Fig. 3, where the shaft C is threaded between the wheels P and Q); a lateral displacement of these wheels is prevented by double brackets secured to, and extending from, the masonry of the furnace. Each of said double chain-wheels is provided with a groove $n^{10}$ (Fig. 3ª) in its nave, and the shaft C has fixed to it four studs $h\ i\ k\ l$ which fit into the said grooves. Thus when the shaft C is displaced laterally, each of the wheels $O^2$, P Q U rotates in turn with the same during the passage of the studs $h\ i\ k\ l$ through the grooves $n^{10}$ of the respective wheels. The studs $h\ i\ k\ l$ are arranged on shaft C in such manner that the wheels $O^2$ P Q U are not rotated all at the same time, but, when the shaft C is displaced from the left to the right, $O^2$ is rotated first, P Q U following in their order, while the reverse order takes place, when the shaft C is displaced from the right to the left. The large wheels of the double wheels $O^2$ P Q U operate the air-valves by means of chains, the small wheels act in the same manner on auxiliary shafts, which open or close the steam- and oxygen-valves by means of suitable gearing. The large wheel $O^2$ operates the air-inlet-valve K, the small wheel $O^2$ acts upon the steam-inlet-valve $f'$ by the aid of shaft $h'$ and the toothed wheels $h^2 h^3$. To the plug of the air-outlet-valves L and L′ respectively are also secured wheels $j$, adapted to operate the two-way-cocks O and O′ respectively by means of a chain, the chain-wheel $j'$ and the bevel-wheels $j^2 j^3$, as illustrated in Fig. 3. The large wheel P operates the air-outlet-valve L, the small wheel P acts upon the oxygen-valve $g'$ by the aid of shaft $l'$ and the toothed wheels $l^2 l^3$. The large wheel Q operates the air-outlet-valve L′, the small wheel Q acts upon the oxygen-valve $g$ by the aid of shaft $k'$ and the toothed wheels $k^2 k^3$. The large wheel U operates the air-inlet-valve K′, the small wheel U acts upon the steam-inlet-valve $f$ by the aid of the shaft $u'$ and the toothed wheels $u^2 u^3$.

In the description of the operation of the apparatus which follows hereinafter, I will state exactly, at what period each of the valves is closed or opened, and it will be understood, that the arrangement of the valves must be such as to secure the required results. It is also evident that the respective dimensions of the chain-wheels and toothed-wheels, and the pitch of the thread on shaft C must be such, that the steam, air and oxygen-valves are each time fully opened or fully closed by the above described mechanism.

It is not necessary to employ two separate coolers R R' as shown in Fig. 2, but I may also use but one of them, as shown in Fig. 6, and place the two serpentine coils within the same, but there must be a separate coil for each set of retorts.

The pipes $w^5$ $w^8$ are not directly connected with the gasometer, but lead into a purifier W of the kind commonly used in the production of gas, and a clack valve is inserted in these pipes to prevent the return of oxygen into the valves $V^2$.

I will now describe the manner in which my improved apparatus works.

In order to start the process, the valves and cocks may be in the following positions: The air-inlet-valve K, admitting the air into the set of retorts A, the air-outlet-valve L, likewise in communication with the set of retorts A, steam-inlet-valve $f'$ and oxygen-valve $g'$ both connected with the set of retorts B, are closed; the oxygen-valve $g$ and the steam-inlet-valve $f$, both communicating with the set of retorts A, and the air-inlet-valve K' and air-outlet-valve L' both communicating with the set of retorts B, are open; the cock O is in such position, that a communication is established between the pipes E and the outer air by means of the pipe M, and the cock O' admits the air from the fan X into the pipe M' and thence into the pipes E'. The shaft C is in its extreme right position. The furnace and the fan X being set into action, the pipes and retorts placed in the former are heated to about 800° Fahrenheit. The chlorid of calcium contained in the pipes E becomes heated, owing to the fact that air is not passing over it at the time, and frees itself of the moisture which it has absorbed during the previous operation, and this moisture escapes through pipe M and two-way cock O. The air propelled by the fan X passes through cock O' into pipe M' and from here into the pipes E', where the chlorid of calcium absorbs the humidity of said air, owing to the fact that it becomes cooler in consequence of the air being passed over it. The air being thus dried passes directly over the furnace through the pipe N', is still further heated and thence proceeds into the collector H' which it enters through the valve K'. From the collector H' the air passes through the set of retorts B, entering each of the same through the channel $c'$ and leaving the same through the channel $c^2$; the air oxidizes the sesqui oxid of manganese placed in the retorts B and the remaining nitrogen, together with a small quantity of air arrives at the collector J', whence it escapes into the atmosphere through the outlet-valve L'. At the same time, steam produced in a boiler, not shown in the drawings, is conducted by suitable pipes to the mouths $f^2$ of the pressure regulated valve (Fig. 7). As the valves $g^4$ are kept off their seats by the spiral-springs $i^6$, the steam may freely pass through the chambers $d$ and mouths $f^3$ into the pipe $w^4$ leading to the steam-inlet-valves $f$ and $f'$. As however only the former is open, the steam is admitted but into the collector H and from here passes through the set of retorts A, entering the same through the channels $c^2$. The oxygen, which has been retained or absorbed by the sesqui oxid of manganese to form manganates during the preceding operation, becomes free, is evolved, rises to collector J and passes through the oxygen-valve $g$ into the pipe $w^8$ leading to cooler R. After having passed through the serpentine pipe $w^9$ placed in the latter the oxygen proceeds through pipe $w^8$ (Fig. 1) to the purifier W and then to the gasometer. As long as oxygen is being evolved from the retorts A, it passes directly through pipes $w^5$ and $w^7$ to the gas purifier W without entering pipe I or the upper part of valve $V^2$. When, however, all the oxygen which can be given off by the material of the set of retorts A, has been exhausted, the pure steam now coming from the boiler, passes through the retorts into the cooling coil unaltered and there becomes condensed. It should be noticed here, that steam is coming from the boiler only when all the oxygen is exhausted, i. e. when the material contained within the retorts has been deoxidized by the steam as far as possible, or when no more of the latter can be consumed by the process of deoxidation. A condensation of steam, therefore, cannot take place as long as oxygen is freed within the retorts, or is flowing through the coils $w^6$ $w^9$ within the vessels R R'. The resulting condensation water then finds access to the upper surface of the diaphragm $b$ of valve $V^2$ by means of the branch-pipe I which is fixed at a lower point of pipe $w^{10}$ than that where the oxygen gas has passed before. In consequence of the difference of temperature between this condensation water and the steam which has solely been in contact with the underneath surface of the diaphragm, this diaphragm becomes suddenly contracted and counteracts the lifting power of spring $i^6$, thus bringing valve $g^4$ unto its seat and preventing any further steam from entering the set of retorts A. In this manner and owing to the fact that the return of oxygen from the purifier is prevented by means of the clack-valve inserted in pipe $w^{10}$ and that no further steam can enter the circuit at the other end, a vacuum is created in consequence of the steam which is still left in the retorts continuing to distill over to the cooler, where the refrigerating has not been interrupted, and this vacuum in the coil must have for effect to withdraw the water contained in cylinder S, thereby causing float $v$ to be lowered. The float $v$ sinks to the bottom of cylinder S, thereby the rod T is moved downward and operates the beam Z, the bent lever $t^2$ and the fulcrum lever $s$. The upper end of the latter causes the conical sleeve $x$ on shaft C to move longitudinally to the left and thus the serrated parts of the sleeve and of the rotating pulley V engage with one another forming a friction clutch. In this way the shaft C is caused to revolve together with pulley V and, in consequence of the threaded bearing $E^2$, the shaft C is at the same time displaced from the right to the left. During this displacement the feather or stud $l$ on shaft C is first drawn into the groove $n^{10}$ of the double-wheel U, causing the latter to partake of the rotation of shaft C; by means of chains passing over the double-wheel U, of the shaft $u'$ and the toothed-wheels $u^2 u^3$, the air-outlet-valve K' communicating with the set of retorts B and the steam-inlet-valve $f$ communicating with the set of retorts A, are closed. As the displacement of the shaft C continues, the stud $k$ engages with the wheel Q and, by the described chains, shaft and toothed wheels, the air-outlet-valve L' communicating with the set of retorts B and the oxygen-valve $g$ communicating with the set of retorts A, are closed. Therefore, at this moment the valves are all closed. The two-way cock O is at about the same time turned so as to establish communication between pipe M and the pipe leading to the fan X for leading the air propelled by said fan to the retorts A through the drying-pipes E, and the two-way cock O' is turned so as to establish communication between pipe M' and the outer air for the purpose of allowing escape of the vapors produced by the influence of the heat on the moisture of the chlorid of calcium contained within the pipes E'. During the further displacement of shaft C the stud $i$ engages with the groove in wheel P and rotates the latter, thus operating the above described mechanism by means of which the air-outlet-valve L communicating with the set of retorts A, and the oxygen-valve $g'$ communicating with the set of retorts B, are opened. Finally the stud $h$ engaging with the groove in wheel $O^2$ causes the latter to rotate, whereby the air-inlet-valve K communicating with the set of retorts A and the steam-inlet-valve $f'$ communicating with the set of retorts B, are opened. Now the reverse processes are automatically started in the sets of retorts A and B and the operation of the parts is the same, only that corresponding parts of the two halves of the apparatus have interchanged their functions. I, therefore, need not explain the operation of the apparatus after the processes have been reversed. It will be also understood, that, when float $v'$ is lowered, the shaft C is made to rotate for a time in a direction opposite to the first by means corresponding to those described as operating the float $v$. According to this the shaft C is displaced from the left to the right, operating the different valves in reverse order and manner, that is to say, opening the valves which were closed the first time, and closing those which were opened the first time.

Having thus fully described the nature of my invention, what I claim, and desire to secure by Letters Patent of the United States, is—

1. In an apparatus for an automatic and continuous production of oxygen gas: the combination of two sets of retorts A B placed at an incline within a furnace, of the collectors H H', J J', the pipes E E' M M' N N' and $w^4$, the valves K K', L L', $f f'$, $g g'$, the cocks O O', the fan X, the pipes $w^5$, $w^8$, the coils $w^6$ $w^9$ within the coolers R R', the pipes $w^7 w^{10}$ the reservoirs S S', branch-pipes I I', floats $v$ $v'$, rods T T' with the sliding-sleeves $x x'$, pulleys V V', said sleeves and pulleys being adapted to form a friction clutch, means for operating the sleeves from the rods T T' of the floats $v v'$ with shaft C, supported in the threaded bearing $E^2$ and carrying the studs $h$ $i k l$ adapted to engage with the double-wheels $O^2$ P Q U, shafts $k'$ $l'$ $u'$ $h'$ and wheels $k^2 k^3$, $l^2 l^3$, $u^2 u^3$, $h^2 h^3$, substantially as and for the purpose described.

2. In an apparatus for an automatic and continuous production of oxygen gas: the combination, with the steam-pipes $w^3 w^4$, oxygen-pipe $w^5$ and branch-pipe I located on the lower part of an upward bend of the oxygen-pipe, of a pressure regulated valve $V^2$ consisting of the valve-casing $a$, having mouths $f^2 f^3 e$ $e'$ for the entrance and exit of steam and oxygen, the diaphragm $b$ dividing the casing into two chambers, the bolt $h^4$ and valve $g^4$ connected to the diaphragm $b$, said valve being adapted to close the communication between the mouths $f^2$ and $f^3$ when the diaphragm is contracted, means for guiding the free end of bolt $h^4$, and a spring $i^6$ adapted to keep valve $g^4$ normally off its seat, substantially as and for the purpose described.

3. In an apparatus for an automatic and continuous production of oxygen gas: the retorts A and B, each consisting of an outer recipient with inlet channel $c'$ and outlet channel $c^2$ and of an inner recipient, the top and bottom whereof are perforated, the space between both recipients being divided longitudinally by means of wires, substantially as and for the purpose described.

In testimony whereof I have signed this specification, at London, in the presence of two subscribing witnesses, this 16th day of April, 1892.

FERDINAND FANTA.

Witnesses:
 ARTHUR KISBEY,
*Clerk, 85 Gresham Street, E. C.*
 HENRY SHERREARD,
*Messenger, 85 Gresham Street, E. C.*